US009766690B2

(12) United States Patent
Jeong et al.

(10) Patent No.: US 9,766,690 B2
(45) Date of Patent: Sep. 19, 2017

(54) METHOD FOR CONTROLLING A SLEEP MODE AND ELECTRONIC DEVICE THEREOF

(71) Applicant: Samsung Electronics Co., Ltd., Gyeonggi-do (KR)

(72) Inventors: Hee-Young Jeong, Seoul (KR); Eung-Do Kim, Gyeonggi-do (KR); Seung-Jin Beak, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 42 days.

(21) Appl. No.: 14/643,265

(22) Filed: Mar. 10, 2015

(65) Prior Publication Data

US 2015/0301588 A1    Oct. 22, 2015

(30) Foreign Application Priority Data

Apr. 21, 2014 (KR) ........................ 10-2014-0047597

(51) Int. Cl.
*G06F 1/32* (2006.01)

(52) U.S. Cl.
CPC .......... *G06F 1/3287* (2013.01); *G06F 1/3203* (2013.01); *G06F 1/3218* (2013.01); *G06F 1/3228* (2013.01); *G06F 1/3265* (2013.01); *G06F 1/3293* (2013.01); *Y02B 60/1242* (2013.01); *Y02B 60/32* (2013.01)

(58) Field of Classification Search
CPC .... G06F 1/3203; G06F 1/3218; G06F 1/3228; G06F 1/3265; G06F 1/3287; G06F 1/3293; Y02B 60/1242; Y02B 60/32
See application file for complete search history.

(56) References Cited

U.S. PATENT DOCUMENTS

| 5,991,600 | A | * | 11/1999 | Anderson | ............. | H04W 68/00 |
| | | | | | | 340/7.34 |
| 6,891,691 | B2 | * | 5/2005 | Winarski | ............... | G11B 19/20 |
| | | | | | | 360/69 |
| 8,233,418 | B2 | * | 7/2012 | Gupta | ............... | H04W 52/0229 |
| | | | | | | 370/311 |
| 8,386,817 | B2 | * | 2/2013 | Yamanaka | ............ | G06F 1/3203 |
| | | | | | | 709/217 |
| 8,850,251 | B1 | * | 9/2014 | Maeng | .................. | G06F 1/3206 |
| | | | | | | 713/300 |

(Continued)

FOREIGN PATENT DOCUMENTS

KR    10-2012-0055107 A    5/2012

OTHER PUBLICATIONS

"Double Tap 2 Wake on Any Android Device (KnockKnock) ElementalX"; Nov. 29, 2013; http://www.youtube.com/watch?v=pBGKSMpjgxo.

(Continued)

*Primary Examiner* — M Elamin
(74) *Attorney, Agent, or Firm* — Cha & Reiter, LLC

(57) ABSTRACT

A method and an apparatus for controlling a sleep mode in an electronic device are provided. The method for controlling the sleep mode in the electronic device includes determining whether a sleep mode entry occurs, identifying an application running when the sleep mode entry occurs, and selectively restricting the sleep mode entry based on the identified application.

14 Claims, 8 Drawing Sheets

(56) References Cited

U.S. PATENT DOCUMENTS

| | | |
|---|---|---|
| 2006/0095805 A1* | 5/2006 | Broyles ................. G06F 1/3203 |
| | | 713/323 |
| 2007/0037610 A1 | 2/2007 | Logan |
| 2009/0164821 A1* | 6/2009 | Drescher ............... G06F 1/3203 |
| | | 713/323 |
| 2010/0002615 A1* | 1/2010 | Gupta ............... H04W 52/0229 |
| | | 370/311 |
| 2010/0080156 A1* | 4/2010 | Nichols ............. H04W 52/0216 |
| | | 370/311 |
| 2012/0110360 A1 | 5/2012 | Lin et al. |
| 2012/0127105 A1 | 5/2012 | Kim |
| 2012/0274588 A1 | 11/2012 | Bamba |
| 2013/0054998 A1 | 2/2013 | Wyatt et al. |
| 2013/0128794 A1* | 5/2013 | Ananthanarayanan H04W 52/02 |
| | | 370/311 |
| 2013/0268865 A1* | 10/2013 | Rhim .................... G06F 3/0484 |
| | | 715/751 |
| 2013/0329576 A1* | 12/2013 | Sinha ................ H04W 52/0229 |
| | | 370/252 |
| 2013/0339720 A1 | 12/2013 | Levy et al. |
| 2014/0038674 A1* | 2/2014 | Srinivasan ........ H04W 52/0251 |
| | | 455/574 |
| 2014/0101472 A1 | 4/2014 | Rohrweck |

OTHER PUBLICATIONS

European Search Report, dated Mar. 9, 2017.

\* cited by examiner

METHOD FOR CONTROLLING A SLEEP MODE AND ELECTRONIC DEVICE THEREOF

CLAIM OF PRIORITY

The present application claims priority under 35 U.S.C. §119 to an application filed in the Korean Intellectual Property Office on Apr. 21, 2014, and assigned Serial number 10-2014-0047597, the entire contents of which are incorporated herein by reference.

BACKGROUND

1. Technical Field

The present disclosure relates generally to a technique for controlling a sleep mode based on operation state of an electronic device.

2. Description of the Related Art

A portable electronic device readily provides a multimedia services including voice and video telephony, information input and output, and data transmission and reception.

A portable electronic device is mostly powered by a battery. When not operating during a given time, the electronic device enters into a sleep mode to avoid power consumption. That is, the electronic device enters the sleep mode to extend the battery life. However, to return to a previous program out of the sleep mode, users need to perform several manipulations on the device.

SUMMARY

To address the above-discussed deficiencies of the prior art, it is a primary aspect of the present disclosure to provide a method and an apparatus for determining whether to selectively enter a sleep mode based on an application program running in an electronic device.

Another aspect of the present disclosure is to provide a method and an apparatus for determining whether to selectively enter a sleep mode based on an application that is operational at the time of entering the sleep mode or an application being executed in a display screen and the current location of an electronic device.

According to one aspect of the present disclosure, a method for controlling an electronic device includes determining whether an entry to a sleep mode occurs; identifying an application or application program that is operational in the electronic device when the sleep mode entry occurs; and selectively restricting the sleep mode entry based on the identified outcome.

The method may further include, when restricting the sleep mode entry, cutting off power supply to a display module and maintaining power supply to a touch detection module.

The method may yet further include, when restricting the sleep mode entry, cutting off power supply to a lighting component of a display module and maintaining power supply to a touch detection module.

The method may yet further include, when restricting the sleep mode entry, lowering a brightness of a display module and maintaining power supply to a touch detection module.

The method may yet further include, when the sleep mode entry event occurs, obtaining a current location of the electronic device. The restricting of the sleep mode may include restricting the sleep mode entry based on the application program being operational in the electronic device and the current location of the electronic device.

According to another aspect of the present disclosure, an electronic device includes a display module; a touch detection module; and a processor for determining whether a sleep mode entry occurs, identifying an application program being executed when the sleep mode entry occurs, and controlling to restrict the sleep mode entry based on the identified outcome.

When restricting the sleep mode entry, the processor may control to cut off power supply to a display module and to maintain power supply to a touch detection module.

When restricting the sleep mode entry, the processor may alternatively control to cut off power supply to a lighting component of the display module and to maintain power supply to the touch detection module.

When restricting the sleep mode entry, the processor may alternatively control to lower a brightness of the display module and to maintain power supply to the touch detection module.

When the sleep mode entry event occurs, the processor may obtain a current location of the electronic device and control to restrict the sleep mode entry based on the application being run in the device and the current location of the electronic device.

According to yet another aspect of the present disclosure, a computer-readable recording medium storing data representing sequences of instructions, and the sequence of instructions which, when executed by a processor, cause the processor to determine whether an entry to a sleep mode occurs, identifying an application that is operational when the sleep mode entry occurs, and selectively restricting the sleep mode entry based on the identified outcome.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features, and advantages of certain exemplary embodiments of the present disclosure will be more apparent from the following description taken in conjunction with the accompanying drawings, in which.

Throughout the drawings, like reference numerals will be understood to refer to like parts, components and structures.

DETAILED DESCRIPTION

Figure 1:
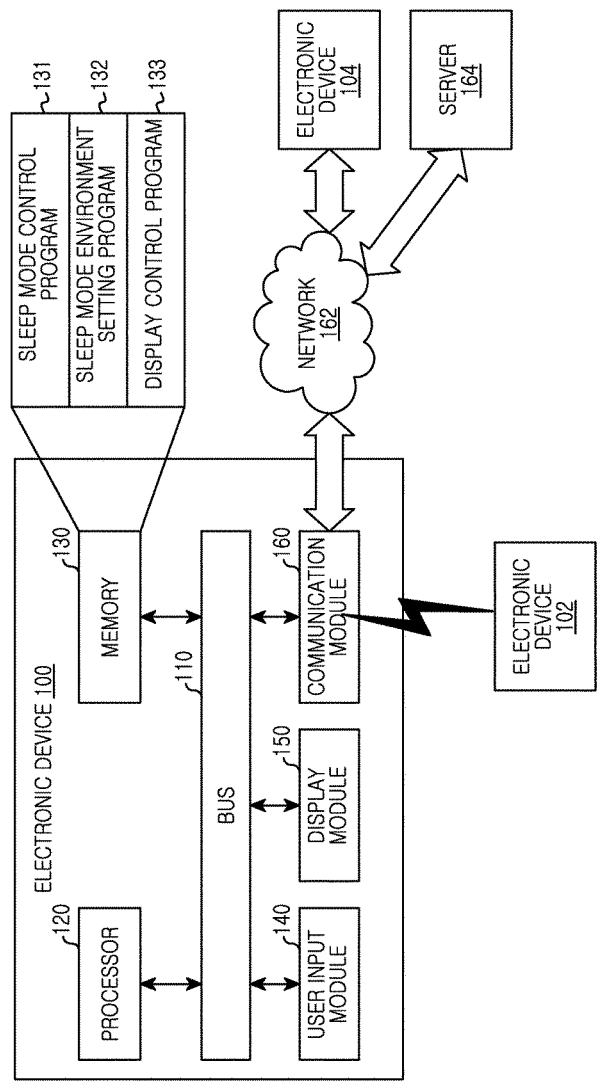
FIG. 1 illustrates an electronic device according to an exemplary embodiment of the present disclosure.

The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. §101 and does not constitute software per se.

An electronic device according to the present disclosure can combine one or more of various devices including a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, mobile medical appliances, an electronic bracelet, an electronic necklace, an appcessory, a camera, a wearable device, an electronic clock, a wrist watch, a smart white appliance (e.g., a refrigerator, an air conditioner, a vacuum cleaner, an artificial intelligence robot, a television (TV), a Digital Versatile Disc (DVD) player, an audio system, an oven, a microwave oven, a washing machine, an air purifier, a digital frame), medial appliances (e.g., Magnetic Resonance Angiography (MRA), Magnetic Resonance Imaging (MRI), Computed Tomography (CT), X-ray, ultrasonicator)), a navigation device, a Global Positioning System (GPS) receiver, an Event Data Recorder (EDR), a Flight Data Recorder (FDR), a set-top box, a TV box (e.g., Samsung HomeSync™, AppleTV™, Google TV™), an electronic dictionary, a in-vehicle infotainment device, electronic equipment for ship (e.g., marine navigation device, gyro compass), avionics, a security device, an e-textile, a digital key, a camcorder, a game console, a Head Mounted Display (HMD), a flat panel display device, a digital album, part of furniture or building/structure having a communication function, an electronic board, an electronic signature receiving device, and a projector. Those skilled in the art shall understand that the electronic device of the present disclosure is not limited those devices.

FIG. 1 is a block diagram of an electronic device according to an exemplary embodiment of the present disclosure.

Referring to FIG. 1, the electronic device 100 can include a bus 110, a processor 120, a memory 130, a user input module 140, a display module 150, a communication module 160, and additional devices such as camera (not shown).

The bus 110 can be a circuit for interlinking the components (e.g., the bus 110, the processor 120, the memory 130, the user input module 140, the display module 150, the communication module 160, and the additional devices such as camera (not shown)) of the electronic device 100 and transferring communication (e.g., control messages) between the components.

Figure 2:
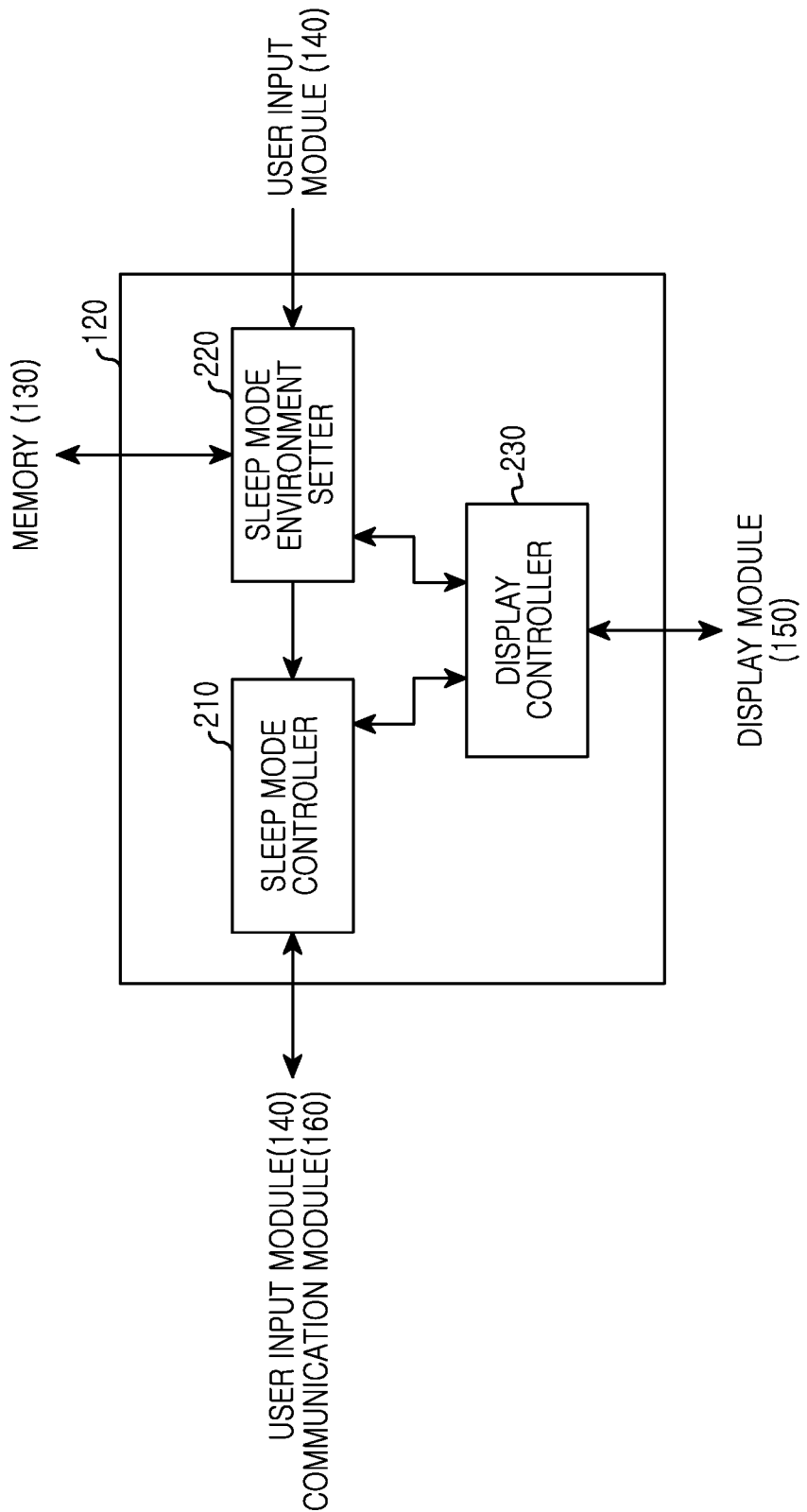
FIG. 2 illustrates a processor according to an exemplary embodiment of the present disclosure.

The processor 120 can receive an instruction from the components of the electronic device 100 via the bus 110, interpret or process the received instruction, and perform an operation or a data processing according to the interpreted instruction. The processor 120 can execute at least one application stored in the memory 130 and control to provide a service of the corresponding application. For example, the processor 120 can be constructed as shown in FIG. 2 to control a sleep mode by executing a sleep mode control program 131, a sleep mode environment setting program 132, and a display control program 133.

The processor 120 can include one or more Application Processor (APs) and one or more Communication Processors (CPs). The AP and the CP can be included in the processor 120 or different Integrated Circuit (IC) packages. The AP and the CP may be included in a single IC package. The AP can control hardware or software components connected to the AP by driving an operating system or an application program, and carry out data processing and operations including multimedia data. The AP can be implemented using a System on Chip (SoC). The CP can perform at least part of a multimedia control function. The CP can identify and authenticate a device in the communication network using a Subscriber Identity Module (SIM) card. In so doing, the CP can provide a user with a service including voice telephony, video telephony, text message, and packet data. The CP can control the data transmission and reception of the communication module 160. The AP or the CP can load and process the instruction or the data received from its non-volatile memory or at least one of the other components, in a volatile memory. The AP or the CP can store data received from or generated by at least one of the other components, in the non-volatile memory. The CP can manage data links and convert a communication protocol in the communication between the electronic device including hardware and other electronic devices connected over the network. The CP can be implemented using a SoC. The processor 120 may further include a Graphics Processing Unit (GPU).

The memory 130 can store the instruction or the data received from or generated by the processor 120 or the other components (e.g., the user input module 140, the display module 150, the communication module 160, and the additional devices such as camera (not shown)). The memory 130 can include an internal buffer and an external buffer. For example, the memory 130 can compress or decompress an image captured by the camera (not shown).

The memory 130 can the sleep mode control program 131, the sleep mode environment setting program 132, and the display control program 133. Each application can be implemented using a programming module, and the programming module can be implemented using software, firmware, and hardware, alone or in a combination of at least two of them.

The sleep mode control program 131 can include at least one software component for controlling the sleep mode based on sleep mode setting information received from the sleep mode environment setting program 132. For a sleep mode event, the sleep mode control program 131 can determine whether the currently running application or application program is preassigned to restrict to entering into the sleep mode in the sleep mode setting information received from the sleep mode environment setting program 132. In the sleep mode event, the sleep mode control program 131 can determine whether the currently running application program and a current location restrict the sleep mode, based on the sleep mode setting information received from the sleep mode environment setting program 132.

Figure 6A:
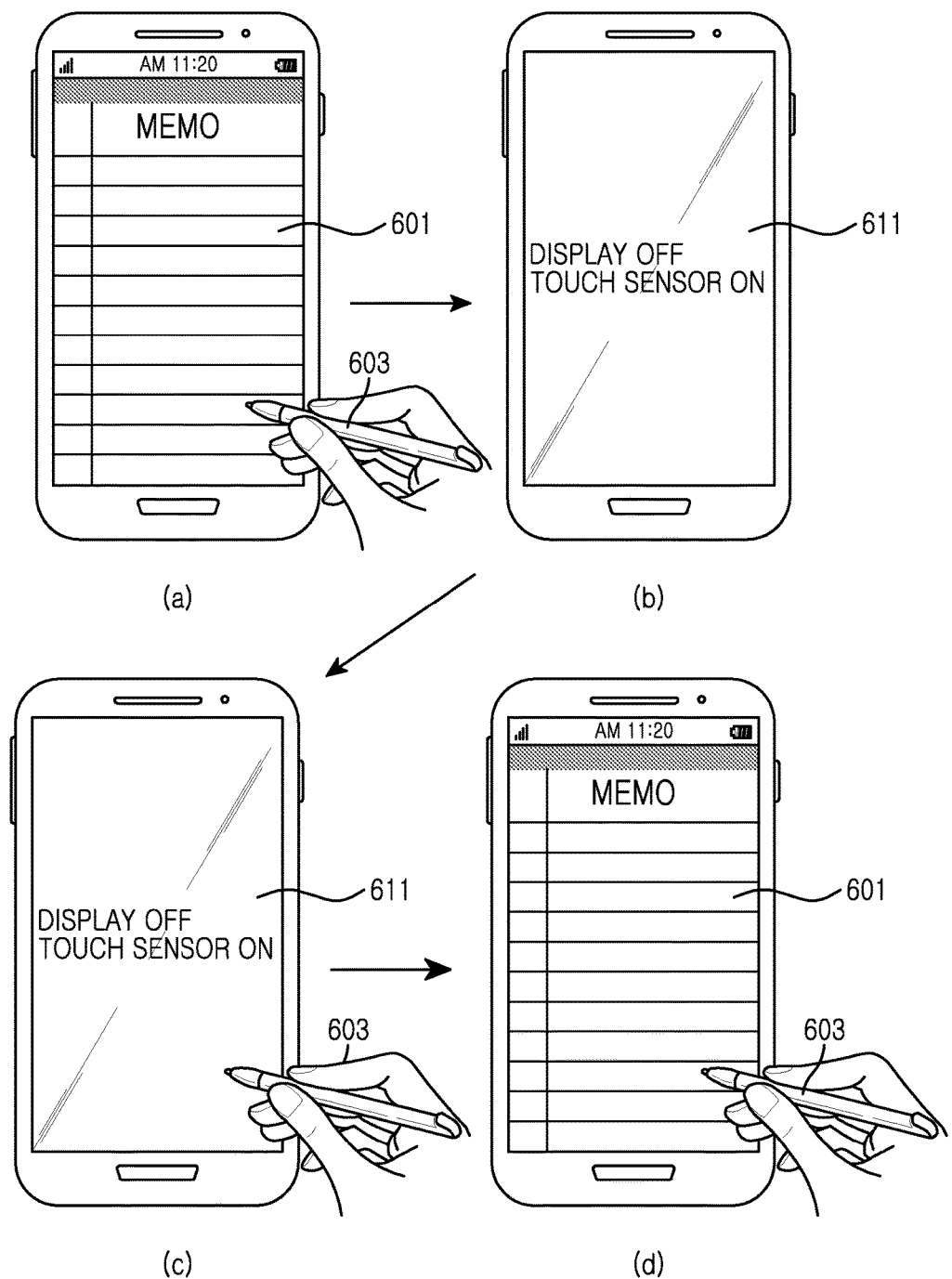
FIG. 6A, FIG. 6B, and FIG. 6C illustrate a screen for returning to the running application program by restricting the sleep mode in the electronic device according to an exemplary embodiment of the present disclosure.
Figure 6B:
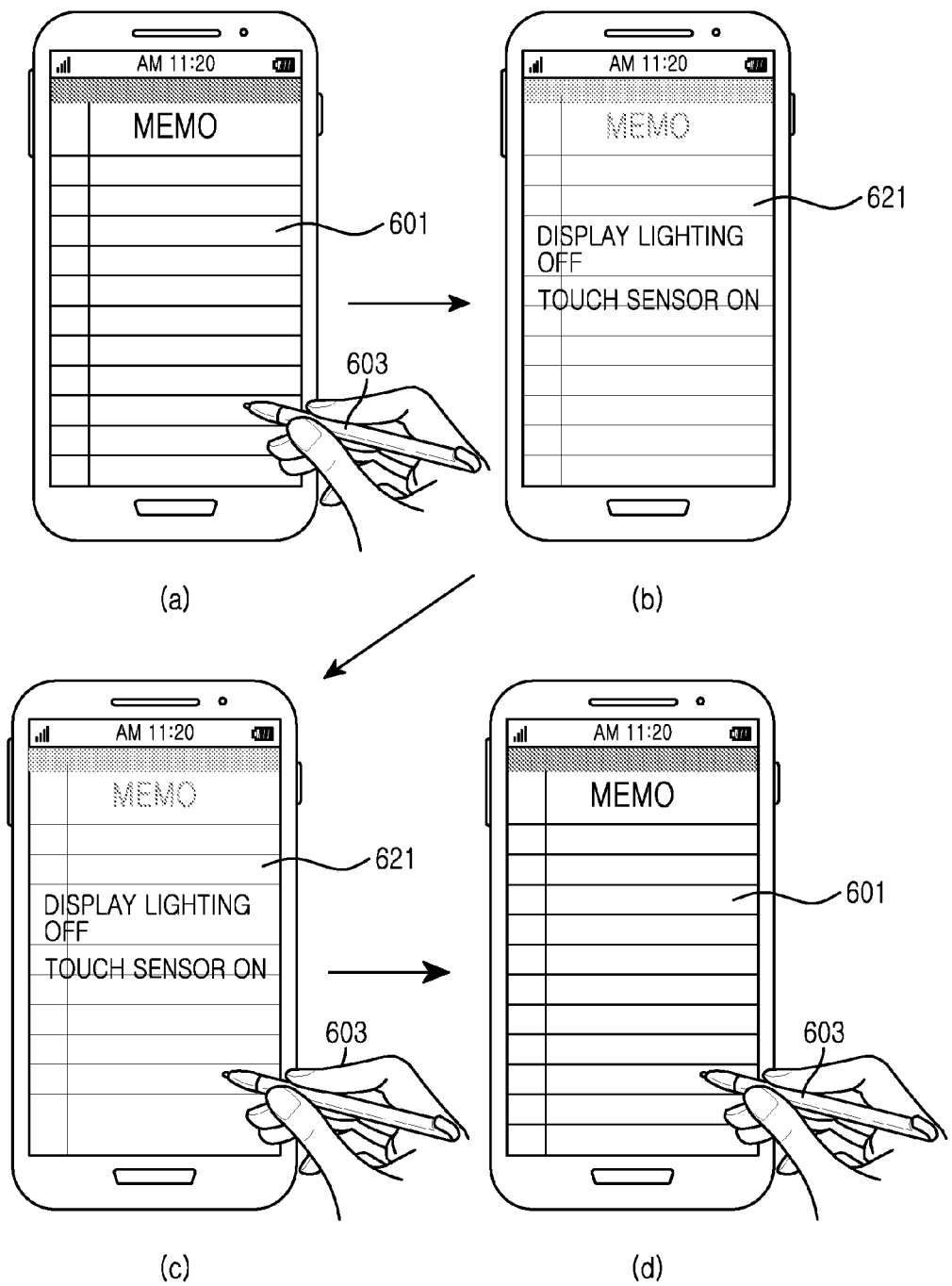
Figure 6C:
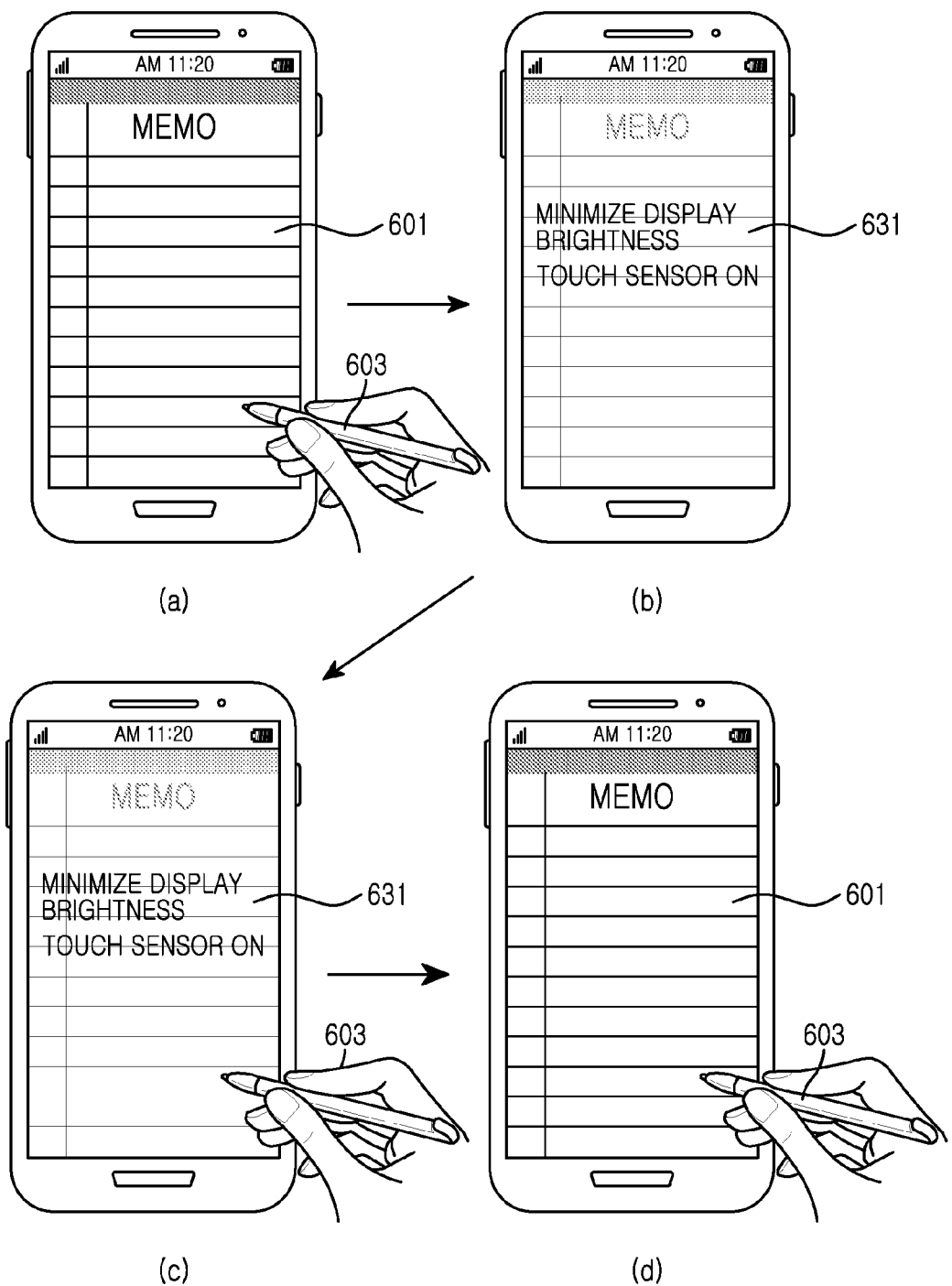

In addition, based on the sleep mode setting information received from the sleep mode environment setting program 132, when a "MEMO" program 601, for example, is running, the sleep mode control program 131 can turn off a display and turn on a touch sensor in step 611 as shown in FIG. 6A. Based on the sleep mode setting information received from the sleep mode environment setting program 132, when the "MEMO" program 601 is running, the sleep mode control program 131 can turn off display lighting and turn on the touch sensor as shown in step 621 in FIG. 6B. Alternatively, based on the sleep mode setting information received from the sleep mode environment setting program 132, when the "MEMO" program 601 is running, the sleep mode control program 131 can minimize the display brightness and turn on the touch sensor in step 613 as shown in FIG. 6C.

The sleep mode environment setting program 132 can include at least one software component for providing the sleep mode setting information so that the sleep mode control program 131 can determine whether to enter the sleep mode. The sleep mode environment setting program 132 can store application program information restricting the sleep mode in the sleep mode setting information. When the "MEMO" program 601 is running, the sleep mode setting information can include information for turning off the display and turning on the touch sensor as shown in FIG. 6A. When the "MEMO" program 601 is running, the sleep mode setting information can include information for turning off the display lighting and turning on the touch sensor as shown in FIG. 6B. When the "MEMO" program 601 is running, the sleep mode setting information can include information for minimizing the display brightness and turning on the touch sensor as shown in FIG. 6C.

The display control program 133 can include at least one software component for controlling to display at least one display data through the display module 150. The display control program 133 may control the display module 150 under control of the sleep mode control program 131. Under the control of the sleep mode control program 131, the display control program 133 can turn off the display and turn on the touch sensor in step 611 as shown in FIG. 6A. When the "MEMO" program 601 is running, the display control program 133 can turn off the display lighting and turn on the touch sensor under the control of the sleep mode control program 131 in step 621 as shown in FIG. 6B. When the "MEMO" program 601 is running, the display control program 133 can minimize the display brightness and turn on the touch sensor under the control of the sleep mode control program 131 in step 631 as shown in FIG. 6C. The display can be the display module 150.

The memory 130 can include an internal memory and an external memory. The internal memory can include at least one of the volatile memory (e.g., Dynamic Random Access Memory (DRAM), Static RAM (SRAM), Synchronous DRAM (SDRAM)) and the non-volatile memory (e.g., One-Time Programmable Read Only Memory (OTPROM), PROM, Erasable PROM (EPROM), Electrically EPROM (EEPROM), mask ROM, flash ROM, NAND flash memory, NOR flash memory). The internal memory may employ a Solid State Drive (SSD). The external memory can include at least one of a Compact Flash (CF), a Secure Digital (SD), a Micro-SD, a Mini-SD, an extreme digital (xD), and a memory stick.

The memory 130 can further include a kernel, a middleware, and an Application Programming Interface (API). The kernel can control or manage system resources (e.g., the bus 110, the processor 120, or the memory 130) used to execute the operation or the function of other programming modules (e.g., the middleware, the API, and the application). The kernel can provide an interface allowing the middleware, the API, or the application to access and control or manage the individual component of the electronic device 100. The middleware can relay data between the API or the application and the kernel. The middleware can perform load balancing on work requests received from the applications by giving priority of the system resource (e.g., the bus 110, the processor 120, or the memory 130) of the electronic device 100 to at least one of the applications. The API, which is an interface for the application to control the kernel or the middleware, can include at least one interface or function for file control, window control, image processing, or text control.

The user input module 140 can receive and forward the instruction or the data from the user to the processor 120 or the memory 130 via the bus 110. The user input module 140 can include a touch panel, a pen sensor, a key, and an ultrasonic input device. For example, the touch panel can recognize the touch input using at least one of capacitive, resistive, infrared, and Surface Acoustic Wave (SAW) techniques. The touch panel may further include a controller. The capacitive touch panel can recognize not only the direct touch but also the proximity (hovering). The touch panel may further include a tactile layer. In this case, the touch panel can provide a tactile response to the user. For example, the pen sensor can be implemented using the same or similar method as or to the user's touch input, or using a separate recognition sheet. For example, the key can include a keypad or a touch key. The ultrasonic input device obtains data by detecting microwave in the electronic device through the pen which generates an ultrasonic signal, and allows radio frequency identification.

The user input module 140 may be controlled by the sleep mode control program 131. For example, the user input module 140 can turn on the touch sensor under the control of the sleep mode control program 131 as shown in FIGS. 6A, 6B, and 6C.

The display module 150 can display an image, a video, or data to the user. For example, the display module 150 can include a panel or a hologram. For example, the panel can employ a Liquid Crystal Display (LCD) or an Active Matrix Organic Light Emitting Diode (AMOLED). The panel can be implemented flexibly, transparently, or wearably. The panel may be constructed as a single module with the touch panel. The hologram can present a three-dimensional image in the air using interference of light. The display module 150 can further include a control circuit for controlling the panel or the hologram.

The display module 150 can display the display data under control of the display control program 133. For example, the display module 150 can display an image received from other electronic device under control of the display control program 133.

The communication module 160 can connect the communication between the electronic device 100 and other electronic devices 102 and 104. The communication module 160 can support short-range communication protocol (e.g., Wireless Fidelity (Wi-Fi), Bluetooth (BT), Near Field Communication (NFC)), or communication network 162 (e.g., Internet, Local Area Network (LAN), Wire Area Network (WAN), telecommunication network, cellular network, satellite network, or Plain Old Telephone Service (POTS)).

The camera (not shown) captures an object through an image sensor. An image processor (not shown) is an Image Signal Processor (ISP) which converts output data (e.g., raw data) from the camera (not shown) to image frame (RGB/YUY) data of a preset format and provides the converted data to the processor 120. The image processor may be included in the camera (not shown). The image processor may be included in the processor 120.

The electronic devices 102 and 104 can be the same as or different from the electronic device 100 in type.

In addition, the electronic device can further include a sensor module. The sensor module can include at least one of a gesture sensor, a gyro sensor, an atmospheric pressure sensor, a magnetic sensor, an acceleration sensor, a grip sensor, a proximity sensor, a Red Green Blue (RGB) sensor, a biometric sensor, a temperature/humidity sensor, a light sensor, and an UltraViolet (UV) sensor. The sensor module can measure a physical quantity or detect the operation status of the electronic device, and convert the measured or detected information to an electric signal. For example, the sensor module can include an E-noise sensor, an electromyography (EMG) sensor, an electroencephalogram (EEG) sensor, an electrocardiogram (ECG) sensor, or a finger print sensor. The sensor module can further include a control circuit for controlling its one or more sensors.

The names of the hardware components of the present disclosure can differ according to the type of the electronic device. The hardware of the present disclosure can include at least one of the components, omit some components, or further include other components. Some of the hardware components can be united to the single entity to carry out the same functions of the corresponding components.

FIG. 2 is a detailed block diagram illustrating subcomponents of the processor according to an exemplary embodiment of the present disclosure.

As shown in FIG. 2, the processor 120 can further includes a sleep mode controller 210, a sleep mode environment setter 220, and a display controller 230.

The sleep mode controller 210 can execute the sleep mode control program 131 stored in the memory 130 and thus control the sleep mode based on the sleep mode setting information received from the sleep mode environment setter 220. For the sleep mode event, the sleep mode controller 210 can determine whether the running application program restricts the sleep mode in the sleep mode setting information received from the sleep mode environment setter 220. For the sleep mode event, the sleep mode controller 210 can determine whether the running application program and the current location restrict the sleep mode, based on the sleep mode setting information received from the sleep mode environment setter 220.

In addition, based on the sleep mode setting information received from the sleep mode environment setter 220, when the "MEMO" program 601 is running, the sleep mode controller 210 can turn off the display and turn on the touch sensor in step 611 as shown in FIG. 6A. Based on the sleep mode setting information received from the sleep mode environment setter 220, when the "MEMO" program 601 is running, the sleep mode controller 210 can turn off the display lighting and turn on the touch sensor in step 621 as shown in FIG. 6B. Alternatively, based on the sleep mode setting information received from the sleep mode environment setter 220, when the "MEMO" program 601 is running, the sleep mode controller 210 can minimize the display brightness and turn on the touch sensor in step 613 as shown in FIG. 6C.

The sleep mode environment setter 220 can execute the sleep mode environment setting program 132 stored in the memory 130 and thus provide the sleep mode setting information so that the sleep mode controller 210 can determine whether to enter the sleep mode. The sleep mode environment setter 220 can store the application program information restricting the sleep mode in the sleep mode setting information. When the "MEMO" program 601 is running, the sleep mode setting information can include the information for turning off the display and turning on the touch sensor as shown in FIG. 6A. Alternatively, when the "MEMO" program 601 is running, the sleep mode setting information can include the information for turning off the display lighting and turning on the touch sensor as shown in FIG. 6B. Alternatively, when the "MEMO" program 601 is running, the sleep mode setting information can include the information for minimizing the display brightness and turning on the touch sensor as shown in FIG. 6C.

The display controller 230 can execute the display control program 133 stored in the memory 130 and thus control to display the display data through the display module 150. The display controller 230 may control the display module 150 under control of the sleep mode controller 210. Under the control of the sleep mode controller 210, the display controller 230 can turn off the display and turn on the touch sensor in step 611 as shown in FIG. 6A. When the "MEMO" program 601 is running, the display controller 230 can turn off the display lighting and turn on the touch sensor in step 621 under the control of the sleep mode controller 210 as shown in FIG. 6B. When the "MEMO" program 601 is running, the display controller 230 can minimize the display brightness and turn on the touch sensor in step 631 under the control of the sleep mode controller 210 as shown in FIG. 6C. The display can be the display module 150.

An electronic device for controlling a sleep mode can include a display module; a touch detection module; and a processor for determining whether a sleep mode entry event occurs, identifying a running application program, and controlling to restrict the sleep mode entry based on the running application program.

When restricting the sleep mode entry, the processor can control to cut off power supply to the display module and to maintain power supply to the touch detection module.

Alternatively, when restricting the sleep mode entry, the processor can control to cut off power supply to a lighting component of the display module and to maintain power supply to the touch detection module.

Alternatively, when restricting the sleep mode entry, the processor can control to lower a brightness of the display module and to maintain power supply to the touch detection module.

Alternatively, when the sleep mode entry event occurs, the processor can obtain a current location of the electronic device and control to restrict the sleep mode entry based on the running application program and the current location of the electronic device.

Figure 3:
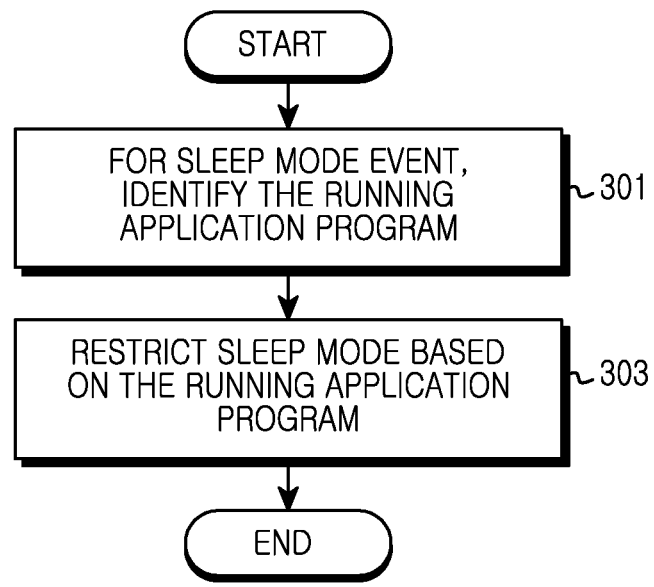
FIG. 3 illustrates a method for restricting a sleep mode based on a running application program in the electronic device according to an exemplary embodiment of the present disclosure.

FIG. 3 illustrates a method for restricting the sleep mode based on the running application program in the electronic device according to an exemplary embodiment of the present disclosure.

In operation, when a sleep mode event occurs, the electronic device can identify the application program displayed in the current screen in step 301.

In step 303, the electronic device can restrict the sleep mode based on the identification of the running application program. For example, when the "MEMO" program 601 is running, the electronic device can turn off the display and turn on the touch sensor in step 611 as shown in FIG. 6A. Alternatively, when the "MEMO" program 601 is running, the electronic device can turn off the display lighting(for example, the lighting of LED backlight modules which are configured in display module 150_and turn on the touch sensor in step 621 as shown in FIG. 6B. Alternatively, when the "MEMO" program 601 is running, the electronic device can minimize the display brightness and turn on the touch sensor in step 613 in step 631 as shown in FIG. 6C.

Figure 4:
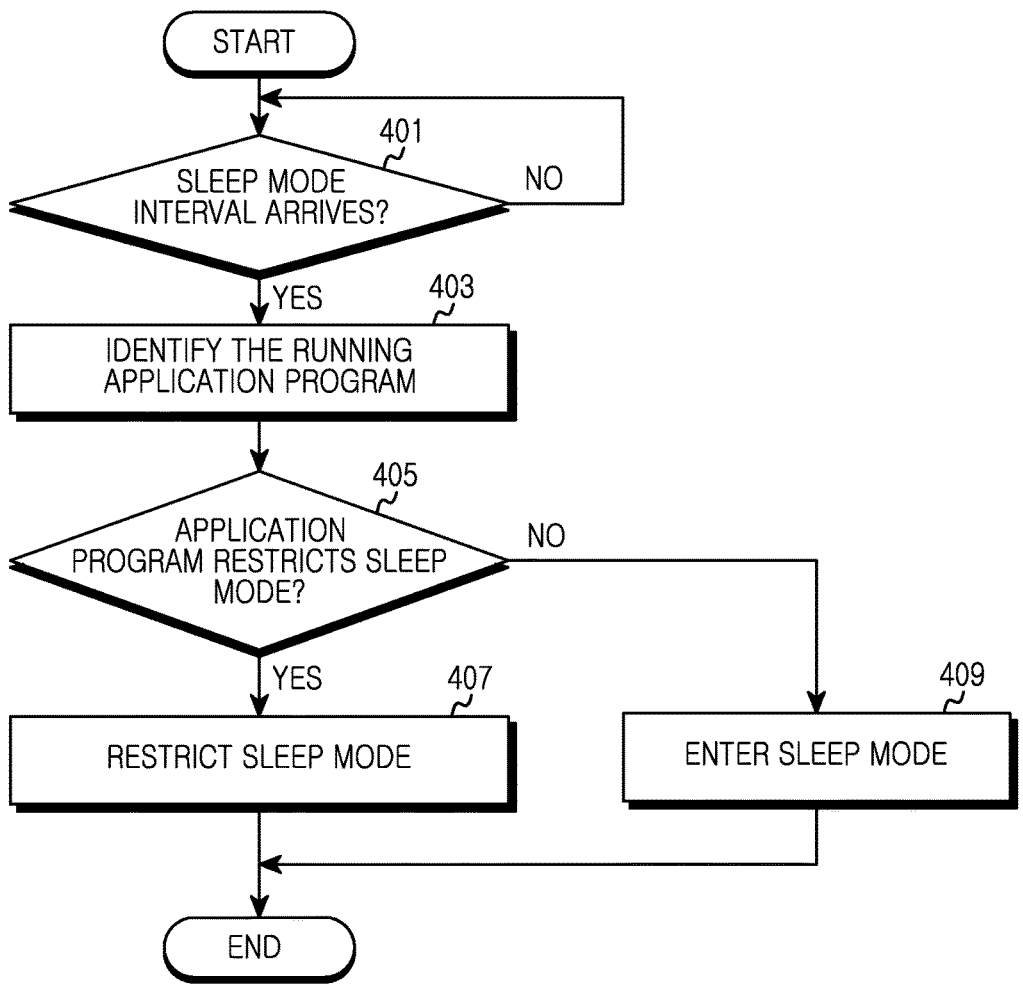
FIG. 4 illustrates a method for restricting the sleep mode based on the running application program when the electronic device is in the sleep mode according to an exemplary embodiment of the present disclosure.

FIG. 4 illustrates a method for restricting the sleep mode based on the running application program when the electronic device is in the sleep mode according to an exemplary embodiment of the present disclosure.

Referring to FIG. 4, the electronic device can determine whether a sleep mode interval arrives in step 401. The sleep mode interval can be preset in the system or set by the user. When the sleep mode interval does not arrive, the electronic device can periodically determine whether the sleep mode interval arrives.

When the sleep mode interval arrives, the electronic device can identify the currently running application program in step 403. When the sleep mode interval arrives, the electronic device can identify the application program displayed in the current screen.

In step 405, the electronic device can determine the running application program restricts the sleep mode. When the running application program does not restrict the sleep mode, the electronic device can enter the sleep mode in step 409.

When the running application program restricts the sleep mode, the electronic device can restrict the sleep mode in step 407. When the "MEMO" program 601 is running, the electronic device can turn off the display and turn on the touch sensor in step 611 as shown in FIG. 6A. Alternatively, when the "MEMO" program 601 is running, the electronic device can turn off the display lighting and turn on the touch sensor as shown in FIG. 6B. Alternatively, when the "MEMO" program 601 is running, the electronic device can reduce the display brightness and turn on the touch sensor in step 613 as shown in FIG. 6C.

Figure 5:
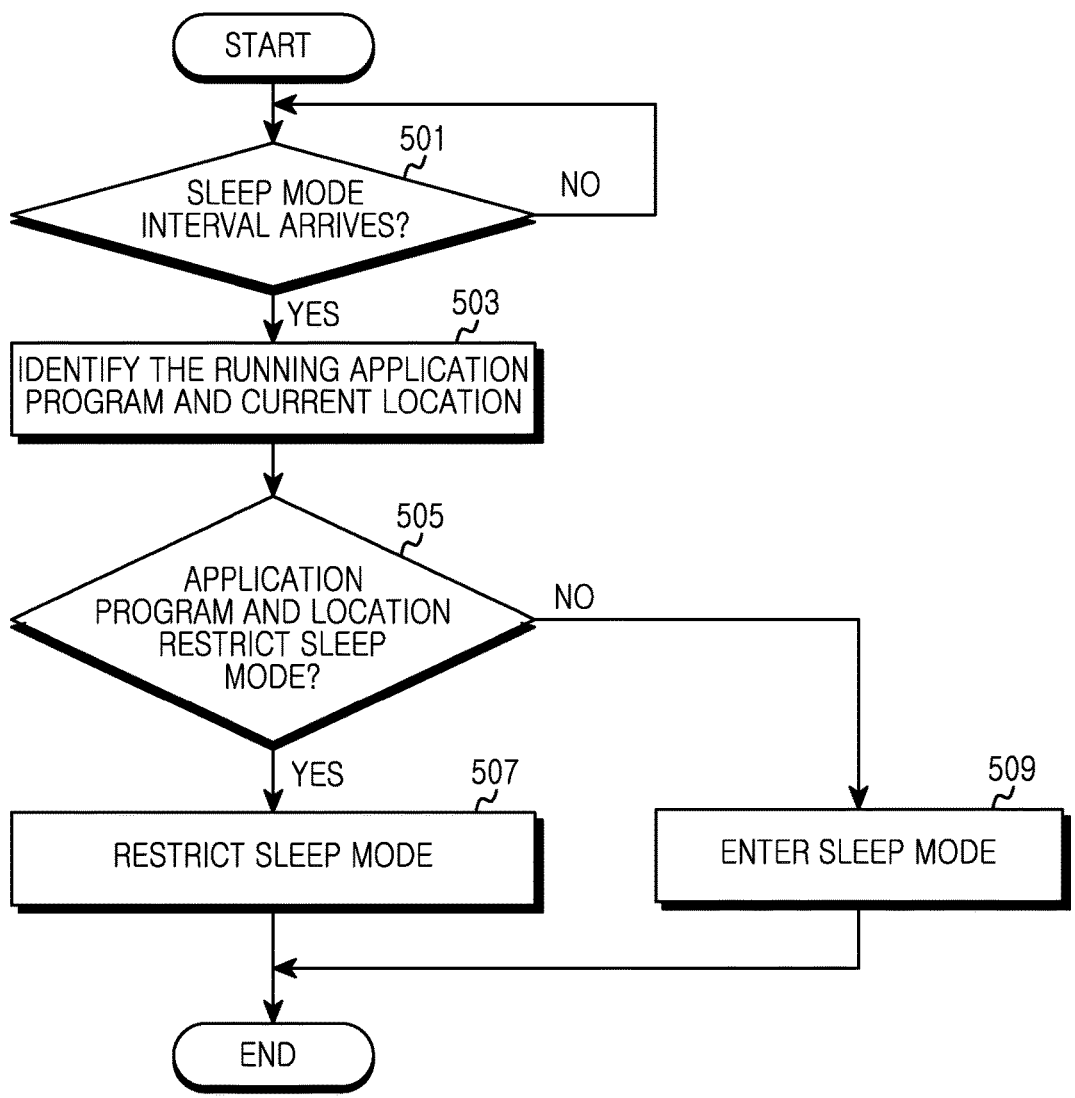
FIG. 5 illustrates a method for restricting the sleep mode based on the running application program and a current location in the electronic device according to an exemplary embodiment of the present disclosure.

FIG. 5 illustrates a method for restricting the sleep mode based on the running application program and the current location of an electronic device according to an exemplary embodiment of the present disclosure.

Referring to FIG. 5, the electronic device can determine whether the sleep mode interval arrives in step 501. The sleep mode interval can be preset in the system or set by the user. When the sleep mode interval does not arrive, the electronic device can periodically determine whether the sleep mode interval arrives.

In step 503, the electronic device can identify the current application program being run in the device and the current location. When the sleep mode interval arrives, the electronic device can identify the application program displayed in the current screen. The electronic device can identify its current location using at least one of a Global Positioning System (GPS), a Global Navigation Satellite System (GNSS), and an accessed base station, and a connected Access Point (AP).

In step 505, the electronic device can determine the currently running application in the device and the location to determine whether to restrict or disenable the entry of a sleep mode. When the current application being run or executed in the device and the device location are determined to not to restrict the sleep mode entry, the electronic device can enter the sleep mode in step 509.

When the running application program and the device location restrict are determined to restrict or not to enter into the sleep mode according to a predefined criteria, the electronic device can restrict the sleep mode in step 507. When the "MEMO" program 601 is running, the electronic device can turn off the display and turn on the touch sensor in step 611 as shown in FIG. 6A. Alternatively, when the "MEMO" program 601 is running, the electronic device can turn off the display lighting and turn on the touch sensor in step 621 as shown in FIG. 6B. Alternatively, when "MEMO" program 601 is running, the electronic device can minimize the display brightness and turn on the touch sensor in step 613 as shown in FIG. 6C.

As such, the electronic device can determine whether to enter the sleep mode based on the currently running application or based on the currently running application program and the current location of the device.

Alternatively, to determine whether to enter the sleep mode, the electronic device can further specify an additional criteria. For example, when recognizing a Radio Frequency Identification (RFID) tag at a particular location, the electronic device can determine whether or not to enter the sleep mode based on the recognized RFID tag.

As another example, when accessing the AP at a particular location, the electronic device can determine whether or not to enter the sleep mode based on Service Set ID (SSID) of the AP.

As another example, when accessing a BT device at a particular location, the electronic device can determine whether or not to enter the sleep mode based on a Media Access Control (MAC) address of the BT device.

As another example, when continuously detecting a noise input over a certain level using a microphone, the electronic device can determine whether or not to enter the sleep mode based on the noise level.

Moreover, the electronic device can determine whether or not to enter the sleep mode based on various additional devices (e.g., a digital pen, a keyboard, and other input devices) connected thereto.

Also, the electronic device can determine whether or not to enter the sleep mode based on a schedule of a particular event (e.g., an educational institute, a meeting, and a seminar) preset in the electronic device by the user.

Further, the electronic device can determine whether or not to enter the sleep mode for a particular application program based on a user's pattern input.

FIGS. 6A, 6B, and 6C depict different screen for selectively restricting the sleep mode in the electronic device according to an exemplary embodiment of the present disclosure.

When a user's input 603 does not occur during the time or within the time period predefined by the system during the "MEMO" program 601, the electronic device can enter the sleep mode as shown in (a) of FIG. 6A. If the "MEMO" program 601 is preprogrammed to restrict or disenable the sleep mode entry, the electronic device can restrict or prevent from entering into the sleep mode, while turning off the display and turning on the touch sensor in step 611 as shown in (b) of FIG. 6A. Thereafter, when the user input 603 occurs as shown in (c) of FIG. 6A, the electronic device can return to the prior window showing "MEMO" program 601 based on the display and sensor are turned back on as shown in (a) of FIG. 6A.

Alternatively, when the user's input 603 does not occur for the time defined by the system during the "MEMO" program 601, the electronic device can enter the sleep mode as shown in (a) of FIG. 6B. If the "MEMO" program 601 is preprogrammed to restrict the sleep mode entry, the electronic device can restrict or prevent from entering into the sleep mode, while turning off the display and turning on the touch sensor in step 621 as shown in (b) of FIG. 6B. Thereafter, when the user input 603 occurs as shown in (c) of FIG. 6B, the electronic device can return or resume back to the "MEMO" program on as shown in (a) of FIG. 6B.

When the user's input 603 does not occur for a specified time period defined by the system during the "MEMO" program 601, the electronic device can enter the sleep mode as shown in (a) of FIG. 6C. If the "MEMO" program 601 is preprogrammed to restrict the sleep mode, the electronic device can restrict the sleep mode, minimize the display brightness, and turn on the touch sensor in step 631 as shown in (b) of FIG. 6C. When the user input 603 occurs as shown in (c) of FIG. 6C, the electronic device can return back to running the "MEMO" program 601 as shown in (a) of FIG. 6C.

A computer-readable recording medium storing instructions can record a program for determining whether a sleep mode entry event occurs, identifying a running application program, and restricting the sleep mode entry based on the running application program.

As set forth above, since the electronic device restricts the sleep mode based on the currently running application, the electronic device user can lessen the manipulation for returning to the application.

Since the electronic device restricts the sleep mode based on the identification of currently running application at the time of entering into the sleep mode and the current location, the electronic device user can lessen the manipulation for returning to the application program.

It will be appreciated that embodiments of the present disclosure according to the claims and description in the specification can be realized in the form of hardware, via the execution of software or a combination of hardware and software.

Any such software may be stored in a computer readable storage medium. The computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present disclosure.

Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. A method for controlling an electronic device, comprising:
    detecting, by a processor, an event related to entering into a sleep mode;
    in response to the event detection, determining, by the processor, a currently executing application in the electronic device;
    controlling, by the processor, the electronic device to operate in a first sleep mode, if the application is not an application that restricts entry into the sleep mode; and
    controlling, by the processor, the electronic device to operate in a second sleep mode, if the application is an application that restricts entry into the sleep mode,
    wherein the first sleep mode is a mode for avoiding power consumption of the electronic device, and
    wherein the second sleep mode is a mode for controlling an operation state of a display based on sleep mode setting information, and for returning the application in response to detecting a user input.

2. The method of claim 1, further comprising:
    while in the second sleep mode, displaying images corresponding to the application in response to detecting the user input.

3. The method of claim 1, wherein controlling the electronic device to operate in the second sleep mode comprising:
    cutting off power supply to the display and maintaining power supply to a touch detection module.

4. The method of claim 1, wherein controlling the electronic device to operate in the second sleep mode comprising:
    cutting off power supply to a lighting component of the display and maintaining power supply to a touch detection module.

5. The method of claim 1, wherein controlling the electronic device to operate in the second sleep mode comprising:
    lowering a brightness of the display and maintaining power supply to a touch detection module.

6. The method of claim 1, further comprising:
    determining a state of the electronic device in response to detecting the event, and
    controlling an entry of the first sleep mode or the second sleep mode based on a type of the application and the state of the electronic device,
    wherein the state of the electronic device includes at least one of a location of the electronic device, a connection state with an external device, a noise level, a schedule, or a user's pattern input.

7. A non-transitory computer-readable storage medium storing one or more programs comprising instructions which, when executed by an electronic device, cause the device to execute the method according to claim 1.

8. An electronic device comprising:
a display;
a touch detection module; and
a processor configured to:
  detect an event related to entering into a sleep mode,
  in response to the event detection, determine a currently executing application in the electronic device,
  control the electronic device to operate in a first sleep mode, if the application is not an application that restricts entry into the sleep mode, and
  control the electronic device to operate in a second sleep mode, if the application is an application that restricts entry into the sleep mode,
  wherein the first sleep mode is a mode for avoiding power consumption of the electronic device, and
  wherein the second sleep mode is a mode for controlling an operation state of a display based on sleep mode setting information, and for returning the application in response to detecting a user input.

9. The electronic device of claim 8, wherein the processor is further configured to display images corresponding to the application in the display in response to detecting the user input by the touch detection module.

10. The electronic device of claim 8, wherein the processor is further configured to control to cut off power supply to the display and to maintain power supply to the touch detection module.

11. The electronic device of claim 8, wherein the processor is further configured to control to cut off power supply to a lighting component of the display and to maintain power supply to the touch detection module.

12. The electronic device of claim 8, wherein the processor is further configured to control to lower a brightness of the display and to maintain power supply to the touch detection module.

13. The electronic device of claim 8, wherein the processor is further configured to:
determine a state of the electronic device in response to detecting the event, and
control an entry of the first sleep mode or the second sleep mode based on a type the application and the state of the electronic device,
wherein the state of the electronic device includes at least one of a location of the electronic device, a connection state with an external device, a noise level, a schedule, or a user's pattern input.

14. A non-transitory computer-readable recording medium having stored thereon data representing sequences of instructions, and the sequences of instructions which, when executed by a processor, cause the processor to:
detect an event related to entering into a sleep mode,
in response to the event detection, determine a currently executing application in an electronic device,
control the electronic device to operate in a first sleep mode or a second sleep mode based on a type of the application,
wherein the first sleep mode is a mode for avoiding power consumption of the electronic device, and
wherein the second sleep mode is a mode for controlling an operation state of a display based on sleep mode setting information, and for returning the application in response to detecting a user input.

* * * * *